J. TISDALE, J. PUTNAM & H. N. ALLEN.
Treadles.

No. 143,543.

Patented Oct. 7, 1873.

Witnesses
S. U. Piper
L. N. Holden

Josiah Tisdale
John Putnam
Horatio N. Allen
by their attorney
R. H. Eddy

UNITED STATES PATENT OFFICE.

JOSIAH TISDALE, JOHN PUTNAM, AND HORATIO N. ALLEN, OF NORWOOD, MASSACHUSETTS, ASSIGNORS TO JOSIAH TISDALE AND JOHN PUTNAM, OF SAME PLACE.

IMPROVEMENT IN TREADLES.

Specification forming part of Letters Patent No. 143,543, dated October 7, 1873; application filed September 3, 1873.

*To all whom it may concern:*

Be it known that we, JOSIAH TISDALE, JOHN PUTNAM, and HORATIO NELSON ALLEN, of Norwood, of the county of Norfolk and State of Massachusetts, have invented a new and useful Mechanism for Revolving a Shaft; and do hereby declare the same to be fully described in the following specification and represented in the accompanying drawings, of which—

Figure 1:
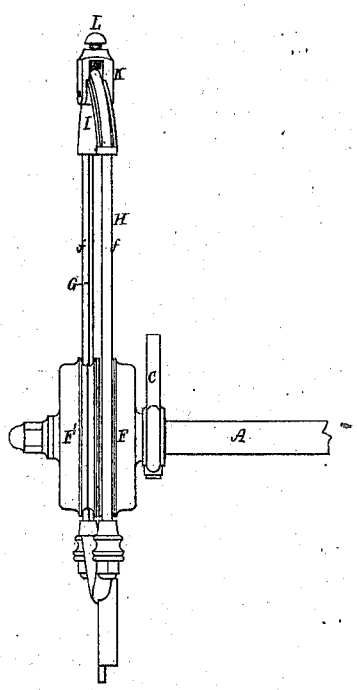
Figure 2:
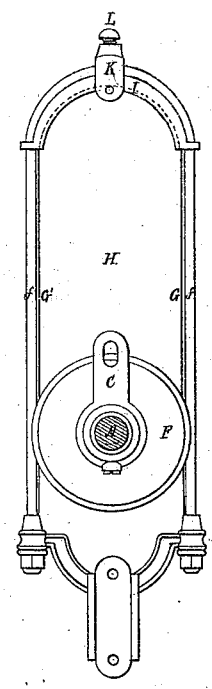
Figure 3:
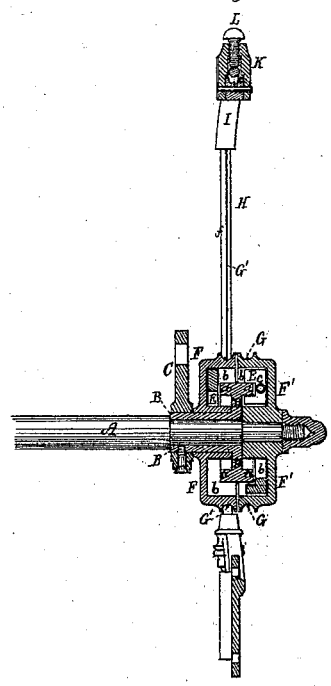
Figure 4:
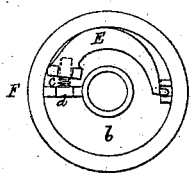
Figure 5:
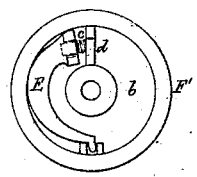
Figure 6:
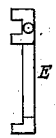

Figure 1 is a side view, Fig. 2 an end elevation, and Fig. 3 a transverse section, of it. Figs. 4 and 5 are inner-side views of the grooved wheels and their furcated brakes, to be hereinafter described. Fig. 6 is an edge view of one of such brakes.

In the said drawings, A denotes an arbor or shaft, formed as shown, and having arranged upon it, concentrically, a short tubular shaft, B, provided with a crank-arm, C, and a brake-wheel, D. This brake-wheel has circular flanges $a\ a$ projecting from its opposite sides and around its circumference, each of such flanges being to operate with, and be spanned by the prongs of, one of a pair of furcated brakes, E E. These brakes, each being shaped as shown in Figs. 4, 5, and 6 of the drawings, are arranged in chambers $b\ b$ of two grooved wheels or pulleys, F F'. Fig. 4 shows one and Fig. 5 the other of the furcated brakes arranged in its wheel, the brake being at one end pivoted to the wheel. Against its other end a helical spring, $c$, bears, as shown, it being supported against a rib or projection, $d$, disposed radially in the wheel. The two chambered wheels F F' turn freely on the arbor A, and are arranged thereon, and on opposite sides of, and so as to cover, the brake-wheel D. Each wheel F F' is grooved on and around its periphery, the groove being to receive one of two wires, G G'. Each wire is wound one or more times about the periphery of its wheel and in the groove, and fastened at one end to an open frame, H, formed very much like the flier of a spinning-frame. This frame, arranged as shown, so that one of its parallel portions, $f\ f$, rests in the groove of one wheel, and the other in the groove of the other wheel, carries at its head an arched slide, I to which the two upper ends of the wires G G' are affixed. A yoke, K, spans the upper part of the frame H, is connected to the slide I, and provided with a screw, L, which screws through it and against the head of the frame. The said screw, yoke, and arched slide constitute a mechanism for straining the bands or wires tightly around the grooved wheels. The band of one wheel is wound around its wheel in a direction opposite to that in which the other band goes about its wheel.

If, now, the arbor A be supposed to be held stationary, and we impart to the frame H a reciprocating rectilinear motion in direction of its length, a revolution in one direction will be imparted to the brake-wheel D, each brake acting or griping the said wheel in succession. While either brake is in action to turn the wheel, the other brake, by its spring, will be kept out of action upon its wheel. The grooved wheels F F', during the movements of the frame H, will be simultaneously revolved by the wires, so as to cause the brakes to turn the brake-wheel constantly in one direction.

From the above it will be seen that if the driving-pulley of a sewing-machine be placed on the arbor A, and clutched to the crank-arm C, and the frame H be applied to the treadle of the machine, so as to be capable of being moved lengthwise up and down thereby, when put in operation by the foot of a person, a continuous rotary motion may be imparted to such driving-wheel. If desirable, each wire, at its middle, may be fastened to its wheel, in order to prevent the wire from slipping on the wheel.

We make no claim to either of the shaft-revolving mechanisms shown and described in the United States Patents 84,144, 87,353, and 136,810, in each of which mechanisms there is no stationary shaft provided with a rotary sleeve, or shaft and mechanism for revolving the latter, as is the case in our invention. In our apparatus the tubular shaft B and the mechanism for putting it in rotation are supported by, and combined with, a stationary shaft, A, which is to carry the driving-pulley of a sewing-machine, which is to revolve freely thereon. Therefore,

We claim as our invention—

1. The combination of the stationary shaft A, the frame H, the bands or wires G G', the chambered and grooved wheels F F', the furcated brakes E E, springs c c, brake-wheel D, and its tubular shaft B, all constructed, arranged, and applied together substantially as and to operate as and for the purpose specified.

2. The screw L, yoke K, and arched slide I, combined and arranged, in manner as specified, with the frame H and the two wires G G', applied thereto and to the groove-wheels F F', as set forth.

JOSIAH TISDALE.
JOHN PUTNAM.
HORATIO N. ALLEN.

Witnesses:
R. H. EDDY,
J. R. SNOW.